United States Patent [19]

Saito et al.

[11] Patent Number: 5,538,335
[45] Date of Patent: Jul. 23, 1996

[54] HYDRAULIC BRAKE SYSTEM FOR A VEHICLE HAVING A PUMP AND A RESERVOIR

[75] Inventors: Tadao Saito, Nagoya; Yasuhito Sekihara, Anjo; Hiroyuki Hattori, Toyota; Hirohisa Kuwana, Toyota; Hiroshi Toda, Toyota; Ryuji Takagaki, Toyota, all of Japan

[73] Assignee: Aisin Seiki Kabushiki Kaisha, Kariya, Japan

[21] Appl. No.: 508,562

[22] Filed: Jul. 28, 1995

[30] Foreign Application Priority Data

Jul. 29, 1994 [JP] Japan .................................. 6-178250
Jun. 8, 1995 [JP] Japan .................................. 7-141936

[51] Int. Cl.$^6$ .............................. B60T 8/40; B60T 17/04
[52] U.S. Cl. ................... 303/116.4; 188/352; 303/113.1; 303/115.1; 303/10
[58] Field of Search .............................. 303/113.1, 116.4, 303/116.3, 10–12, 87, 116.1, 115.1, 115.6, 115.5, 115.4; 188/352; 417/540; 60/413

[56] References Cited

U.S. PATENT DOCUMENTS

| | | | |
|---|---|---|---|
| 4,664,451 | 5/1987 | Sakaguchi et al. | 188/352 |
| 4,875,741 | 10/1989 | Ozawa et al. | 303/116.4 |
| 5,236,253 | 8/1993 | Glasmacher | 303/116.4 |
| 5,324,101 | 6/1994 | Kehl et al. | 188/352 |
| 5,403,078 | 4/1995 | Farr | 188/352 |

OTHER PUBLICATIONS

"Toyota Corona FF Coupe" Service Manual, Toyota Automotive Corporation, Aug. 4, 1987, pp. 4–28 through 4–40.

Primary Examiner—Douglas C. Butler
Attorney, Agent, or Firm—Burns, Doane, Swecker & Mathis

[57] ABSTRACT

The hydraulic brake system for a vehicle which can perform anti-lock control includes a brake circuit for connecting a master cylinder to wheel brakes, a control valve circuit for decreasing hydraulic brake pressure in the wheel brake by discharging brake fluid from the wheel brake to a reservoir, a plunger pump driven by an electric motor for returning brake fluid from the reservoir to the brake circuit and a slit formed on at least the discharge valve seat or the suction valve seat of the pump unit for evacuating the pump chamber of the plunger pump. The hydraulic brake system can further include a one-way valve which permits communication between the pressure chamber of the pump with the reservoir for evacuation.

8 Claims, 5 Drawing Sheets

HYDRAULIC BRAKE SYSTEM FOR A VEHICLE HAVING A PUMP AND A RESERVOIR

FIELD OF THE INVENTION

The present invention relates to a hydraulic brake system for a vehicle and more particularly to a hydraulic brake system for a vehicle that includes an anti-lock brake control.

BACKGROUND OF THE INVENTION

A conventional hydraulic brake system for a vehicle provided with an anti-lock brake control is disclosed in, for example, the service manual "TOYOTA CORONA FF COUPE" (4-p.28~4-p.40) issued by the service department of TOYOTA AUTOMOTIVE CORPORATION on Aug. 4, 1987.

This hydraulic brake system includes a brake circuit for connecting the master cylinder to wheel brakes, a pressure control valve unit for reducing the hydraulic brake pressure in the wheel brake by discharging brake fluid from the wheel brake to a reservoir, and a plunger pump driven by an electric motor for returning brake fluid from the reservoir to the brake circuit. A pump chamber of the plunger pump is isolated from the brake circuit by closing the discharge valve and the suction valve of the plunger pump in a normal condition. The valve opening pressure of the discharge valve and the suction valve generally reaches several atmospheres to increase the discharge efficiency of the pump.

In recent years, when filling a hydraulic brake system with brake fluid, an evacuation method has been adopted in the assembly process of the automotive vehicle. After installing the hydraulic brake system in a vehicle, an apparatus evacuates the brake system through a master cylinder reservoir to pump the air out of the brake system. Then the apparatus supplies brake fluid to the brake system.

However, in the aforementioned conventional hydraulic brake system, since the pump chamber of the plunger pump is isolated from the brake circuit, the apparatus cannot evacuate air in the pump chamber.

A need exists, therefore, for a hydraulic brake system which is not susceptible of such a problem.

SUMMARY OF THE INVENTION

To address this need, one aspect of the present invention provides a hydraulic brake system for performing anti-lock control that includes a brake circuit for connecting a master cylinder to wheel brakes, a control valve circuit for decreasing hydraulic brake pressure in the wheel brake by discharging brake fluid from the wheel brake to a reservoir, a plunger pump driven by an electric motor tier returning brake fluid from the reservoir to the brake circuit, and a slit formed on at least the discharge valve seat or the suction valve seat of the pump unit for evacuation. The hydraulic brake system further includes a one-way valve which permits communication between the pressure chamber of the pump and the reservoir for evacuation.

In accordance with another aspect of the present invention, a hydraulic brake system for a vehicle includes a master cylinder having at least one pressure chamber, a reservoir, and an actuator for connecting the at least one pressure chamber to wheel brakes of the vehicle to increase hydraulic brake pressure in the wheel brakes by supplying brake fluid to the wheel brakes and for connecting the wheel brakes to the reservoir to reduce the hydraulic brake pressure in the wheel brakes by discharging brake fluid from the wheel brakes to the reservoir. The actuator includes a plunger pump having a pump chamber in which is slidably disposed at least a portion of a pump plunger that is operatively associated with a motor. The pump forming a part of the actuator includes an arrangement for evacuating said pump chamber during supply of vacuum from the master cylinder.

BRIEF DESCRIPTION OF THE DRAWING FIGURES

The foregoing features and other aspects of the present invention will become readily apparent from the detailed description of the invention set forth below considered with reference to the accompanying drawing figures in which like elements bear like reference numerals and wherein.

DETAILED DESCRIPTION OF THE PREFERRED EMBODIMENTS

Figure 1:
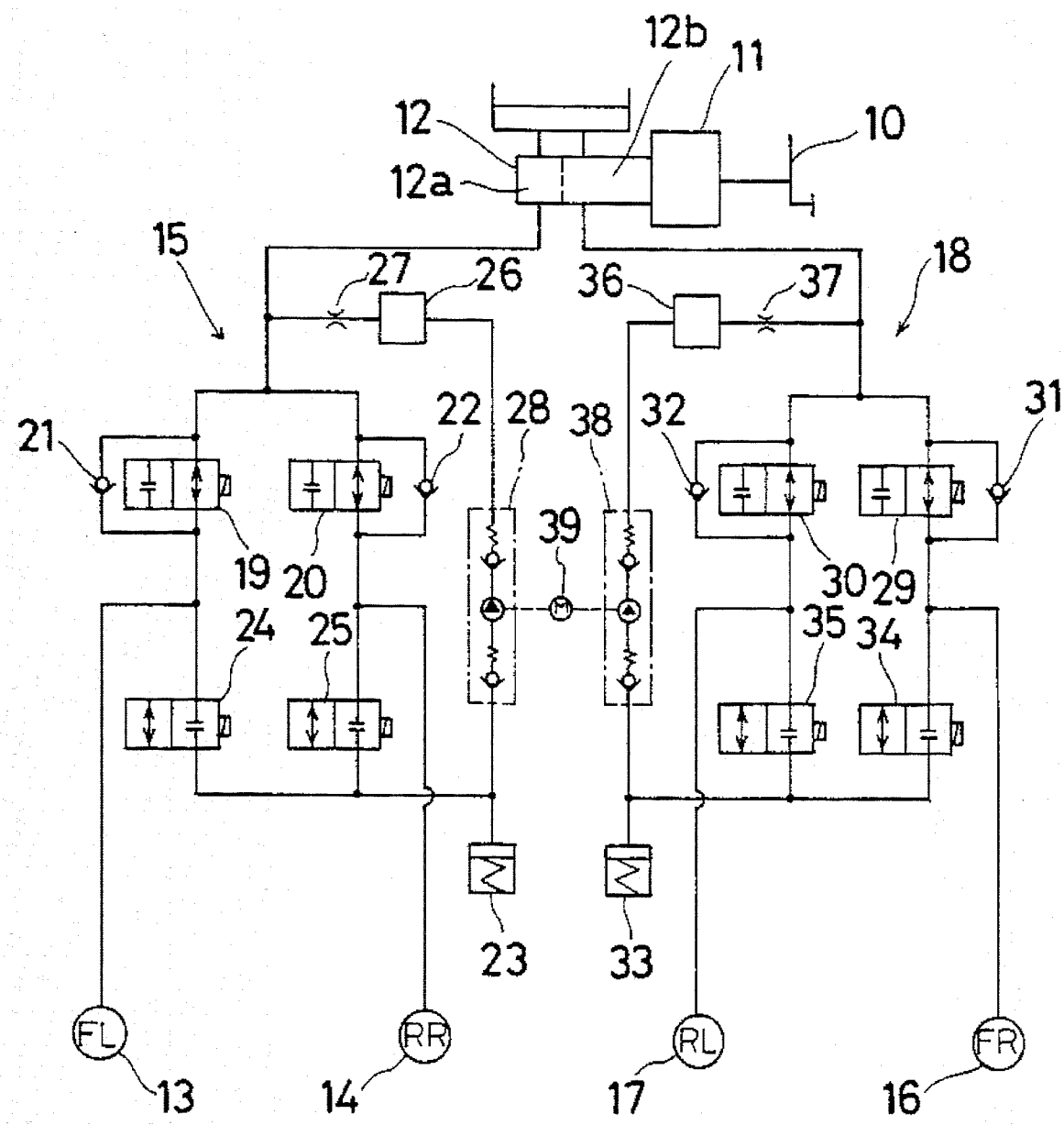
FIG. 1 is a schematic illustration of the hydraulic brake system according to a first embodiment of the present invention.

Referring to FIG. 1, there is illustrated a hydraulic brake system for a front engine, front wheel drive vehicle according to a first embodiment of the present invention. In FIG. 1, a depressing force applied to a brake pedal 10 is increased by a booster 11 and is transmitted to the master cylinder 12. The master cylinder 12 has two pressure chambers 12a, 12b. The vehicle is provided with four wheel brakes 13, 14, 16, 17, with the front left brake 13 and the rear right brake 14 being connected to the first pressure chamber 12a of the master cylinder 12 through an actuator 15, and the front right brake 16 and the rear left brake 17 being connected to the second pressure chamber 12b of the master cylinder 12 through another actuator 18.

The actuator 15 includes a two port, two position normally open valve unit 19 which, when operated, is adapted to block communication between the front left brake 13 and the first pressure chamber 12a of the master cylinder 12, a two port, two position normally open valve unit 20 which, when operated, is adapted to block communication between the rear right brake 14 and the first pressure chamber 12a of the master cylinder 12, a one-way valve unit 21 connected in parallel to the valve unit 19 which only permits fluid pressure to flow from the wheel brake side to the master cylinder side, a one-way valve unit 22 connected in parallel to the valve unit 20 which only permits fluid pressure to flow from the wheel brake side to the master cylinder side, a two port, two position normally closed valve unit 24 which, when operated, is adapted to communicate the front left brake 13 with a reservoir 23, a two port, two position normally closed valve unit 25 which, when operated, is adapted to communicate the rear right brake 14 with a reservoir 23, and a plunger pump unit 28 driven by an electric motor 39 for pumping brake fluid from the reservoir 23 to the hydraulic circuit between the master cylinder 12 and the valve unit 19, 20 through a damper 26 and an orifice 27.

The other actuator 18 includes a two port, two position normally open valve unit 29 which, when operated, is adapted to block communication between the front right brake 16 and the second pressure chamber 12b of the master cylinder 12, a two port, two position normally open valve unit 30 which, when operated, is adapted to block communication between the rear left brake 17 and the second pressure chamber 12b of the master cylinder 12, a one-way valve unit 31 connected in parallel to the valve unit 29 which only permits fluid pressure to flow from the wheel brake side to the master cylinder side, a one-way valve unit 32 connected in parallel to the valve unit 30 which only permits fluid pressure to flow from the wheel brake side to the master cylinder side, a two port, two position normally closed valve unit 34 which, when operated, is adapted to communicate the front right brake 16 with a reservoir 33, a two port, two position normally closed valve unit 35 which, when operated, is adapted to communicate the rear left brake 17 with a reservoir 33, and a plunger pump unit 38 driven by an electric motor 39 which pumps brake fluid from the reservoir 33 to the hydraulic circuit between the master cylinder 12 and the valve unit 29, 30 through a damper 36 and an orifice 37. As can be seen from FIG. 1, the same electric motor 39 operates both of the pump units 28, 38. In addition, the pump units 28 and 38 are identical.

Figure 2:
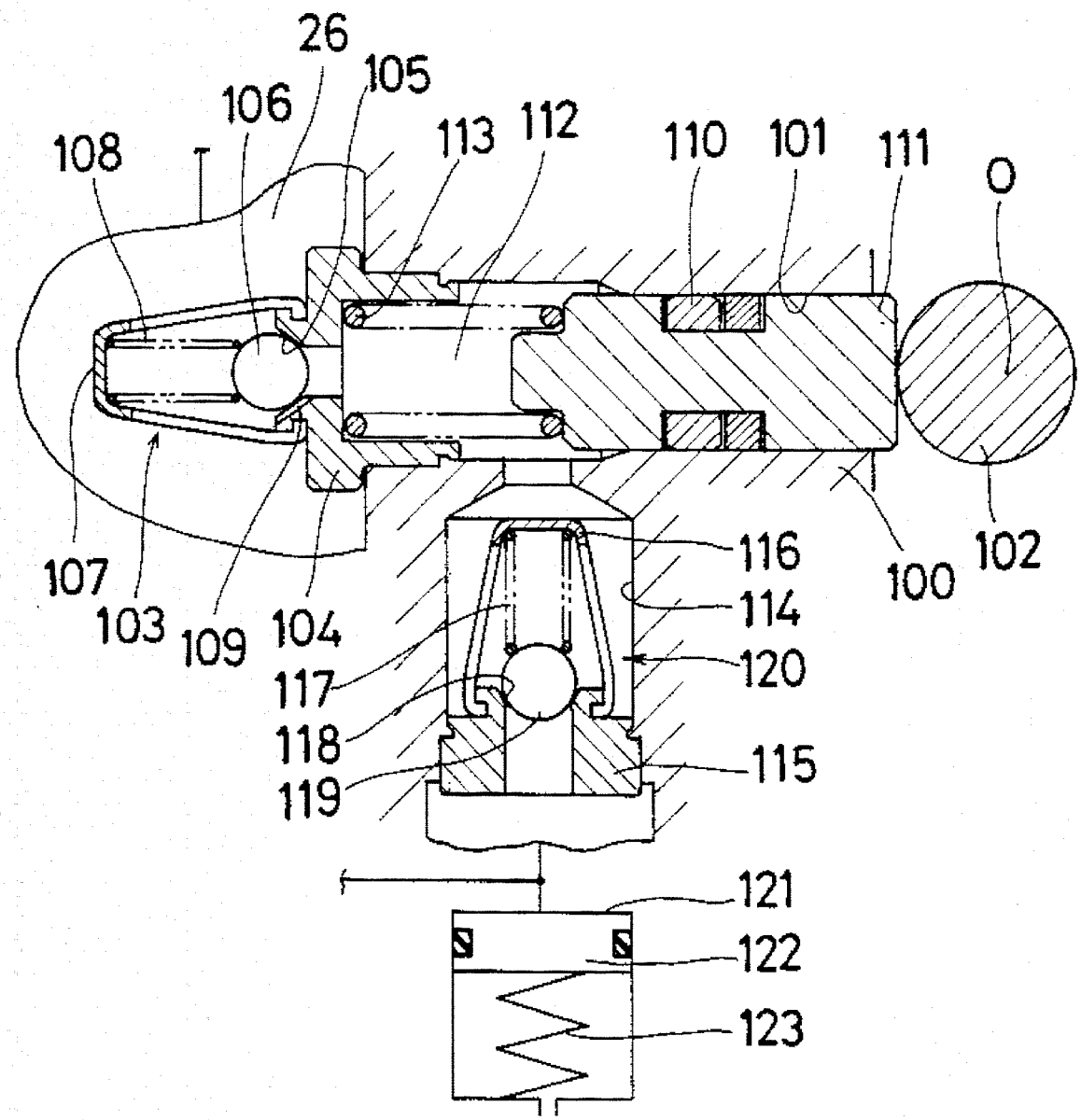
FIG. 2 is an enlarged cross-sectional view of one embodiment of the plunger pump utilized in the system shown in FIG. 1.

The pump unit 28 is shown in detail in FIG. 2. An operational cam 102 is located adjacent the right side of a cylinder 101 of a body 100 and is rotated on an axis "O" by the electric motor 39 shown in FIG. 1. A valve seat member 104 of a discharge valve 103 is disposed in the left side of the cylinder 101. The left side of the valve seat member 104 is expanded and exposed in the damper 26. A ball type valve body 106 is pressed against a tapered valve seat 105 by a coil spring 108. The coil spring 108 is installed between the valve body 106 and a retainer 107 that is attached to the valve seat member 104. The discharge valve 103 is composed of the valve seat member 104, the ball type valve body 106, the retainer 107, and the coil spring 108. A small slit 109 is formed on the tapered valve seat 105 to permit the evacuation of air.

A pump plunger 111 provided with a ring type seal member 110 is installed in the right side part of the cylinder 101 and is adapted to move in the axial direction of the cylinder 101. A coil spring 113 is positioned in the pump chamber 112 that is formed between the pump plunger 111 and the valve seat member 104. The coil spring 113 presses the right end of the pump plunger against the operational cam 102.

A cylinder 114 is formed in the body 100 below the cylinder 101 and is connected to the pump chamber 112. A suction valve 120 is positioned in the cylinder 114 and is composed of a valve seat member 115 fixed to the body 100, a retainer 116 installed in the seat member 115, and a ball type valve body 119. The ball type valve body 119 is pressed against a tapered valve seat 118 of the valve seat member 115 by a spring 117 which is placed between the retainer 116 and the ball type valve body 119.

A piston 122 is positioned in the reservoir 123 that is formed as a cylinder in the body 100. The piston 122 is fluid tight during axial movement in the cylinder. A brake fluid room or area 121 is formed between the upside of the cylinder and the upside of the piston 122 to be connected to the entrance of the suction valve 120. A coil spring 123 presses the piston 122 against the upside of the cylinder. The area which contains the coil spring 123 is at atmospheric pressure.

A control valve circuit for the brake fluid comprises the valve units 19, 20, 24, 25, 29, 30, 34, and 35.

The valve units 19, 20, 24, 25, 29, 30, 34, 35 and the electric motor 39 are controlled by an electronic control system (not shown) to prevent the wheels from locking according to the behavior of the wheels during braking. The electronic control system detects the behavior of each wheel by a signal from a revolution sensor installed in each wheel, determines whether to decrease or increase brake fluid in each wheel, and operates the valve units 19, 20, 24, 25, 29, 30, 34, 35 and the electric motor 39 accordingly. The electric motor 39 drives both of the plunger type pump units 28, 38 during anti-lock control.

During braking, if both of the valve units 19, 24 are operated (i.e., if the normally open valve unit 19 is closed and the normally closed valve unit 24 is opened), the brake fluid in the wheel brake 13 flows out to the reservoir 23 to decrease the brake pressure in the wheel brake 13. If the valve unit 19 is maintained in the operational state (i.e., is maintained in the closed condition) while the operation of the valve unit 24 is stopped (i.e., the valve unit 24 is returned to the normally closed position), the brake fluid in the wheel brake 13 stops flowing out to the reservoir 23 to maintain brake pressure in the wheel brake 13. If the operation of both of the valve units 19, 24 is stopped (i.e., the normally open valve unit 19 is opened and the normally closed valve unit 24 is closed), brake fluid is sent from the master cylinder 12 to the wheel brake 13 to increase the brake pressure in the wheel brake 13. The pump unit 28 returns the brake fluid in the reservoir 23 to the master cylinder 12 through the damper 26 and the orifice 27.

After installing the hydraulic brake system in a vehicle, vacuum is supplied from the master cylinder to the wheel brake 13, 14, 16, 17 through the normally open valve units 19, 20, 29, 30 to evacuate the air in the brake circuit. In this situation, the valve units 24, 25, 34, 35 or the valve units 24, 34 are operated (i.e., moved to the open state) so that the vacuum is supplied to the reservoirs 23, 33 through the valve units 24, 25, 34, 35 to evacuate air in the reservoirs 23, 33. The vacuum is also supplied to the damper 26 through the orifice 27, and then supplied to the pump chamber 112 and the cylinder 114 from the damper 26 through the slit 109 to evacuate the air in the pump chamber 112 and the cylinder 114. The air in the plunger type pump unit 38 is evacuated in the same way as the plunger type pump unit 28.

As mentioned above, after evacuating the air in the hydraulic brake system, the hydraulic brake system is filled up with brake fluid supplied from the master cylinder.

Figure 3:
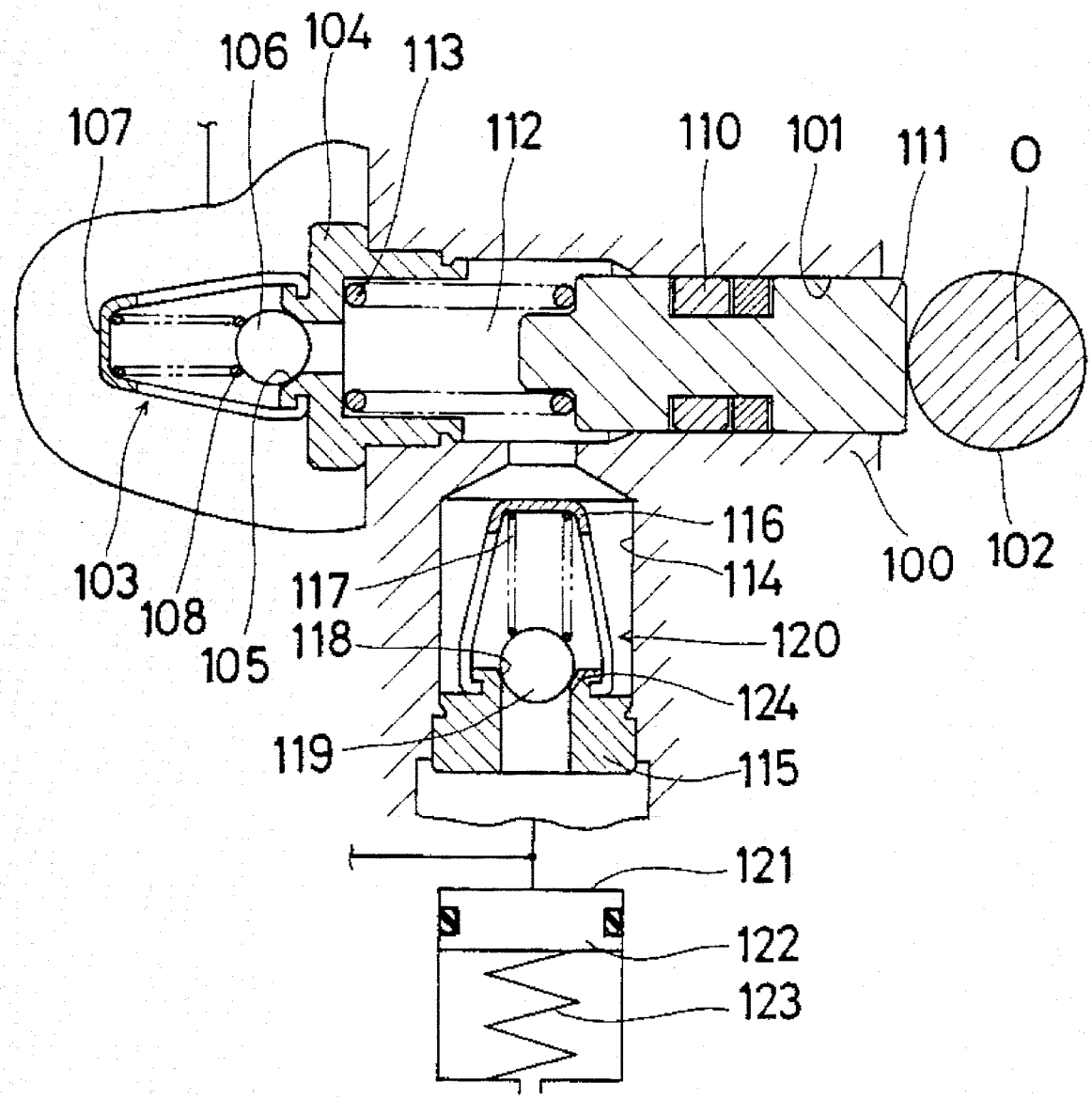
FIG. 3 is an enlarged cross-sectional view of the plunger pump according to a second embodiment of the present invention.

Referring to FIG. 3, there is illustrated a plunger type pump 28 of the second embodiment of the present invention. In the second embodiment of the present invention, the valve seat 118 of the suction valve 120 is provided with the slit 124 for evacuation and the valve seat 105 of the discharge valve 103 does not have such an evacuation slit. Vacuum is supplied to the reservoirs 23, 33 through the valve units 24, 25, 34, 35 and then the vacuum is supplied to the cylinder 114 and the pump room 112 through the slit 124. In the same way, the vacuum is supplied to the plunger type pump 38.

Figure 4:
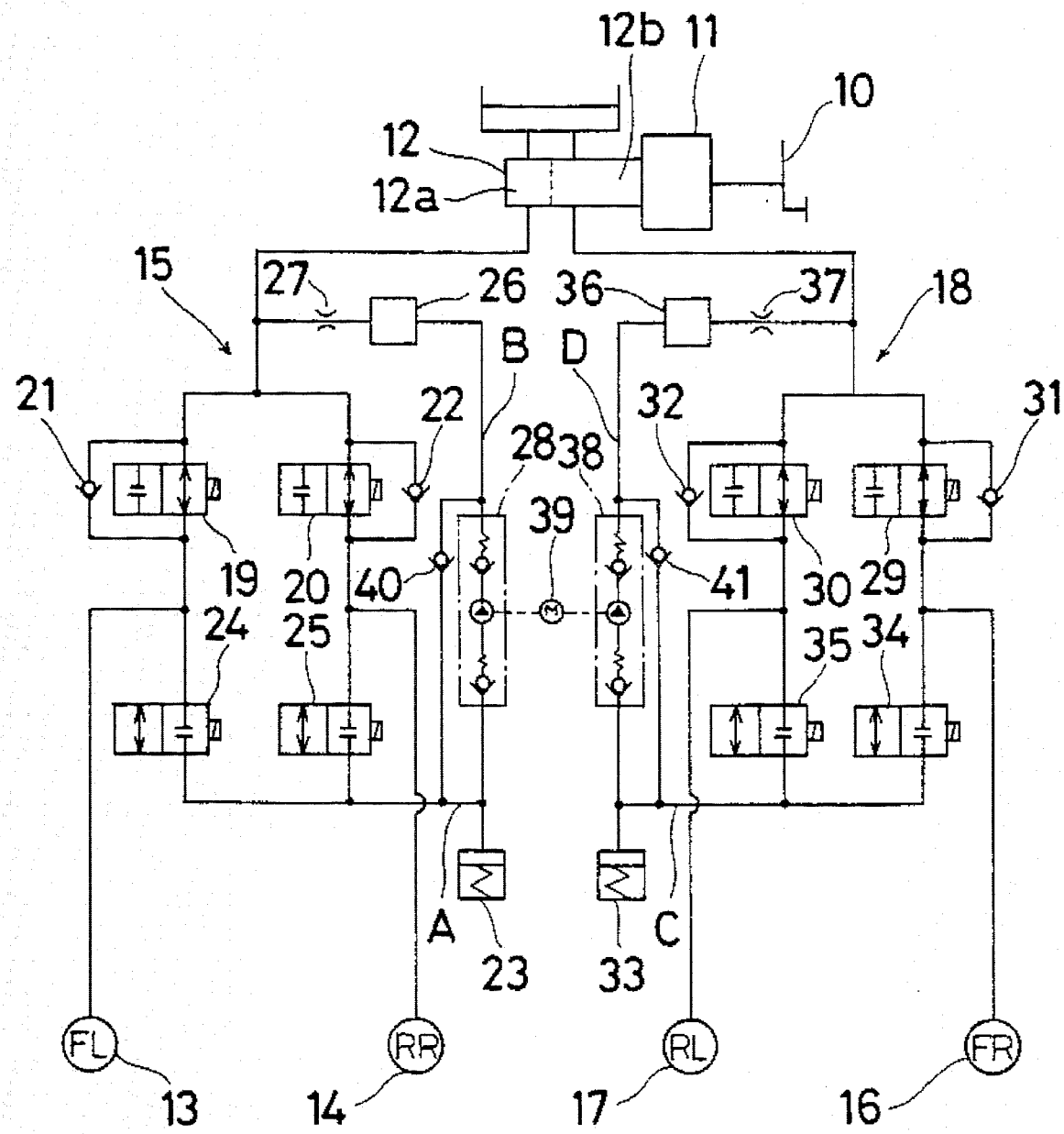
FIG. 4 is a schematic illustration of another hydraulic brake system according to the present invention.

Referring to FIG. 4, there is illustrated a hydraulic brake system for a front engine, front wheel drive vehicle according to another embodiment of the present invention. In FIG. 4, a one-way valve unit 40 connects a part of the brake circuit "A" connected to the reservoir- 23 and a part of the brake circuit "B" connected to the first pressure chamber 12a of the master cylinder 12. The one-way valve unit 40 for evacuation only conducts pressure from the wheel brake side to the master cylinder side.

Another one-way valve unit 41 connects a part of the brake circuit "C" connected to the reservoir 33 and a part of the brake circuit "D" connected to the second pressure chamber 12b of the master cylinder 12. The one-way valve unit 41 for evacuation only conducts pressure from the wheel brake side to the master cylinder side. The rest of the hydraulic brake system is the same as the hydraulic brake system shown in FIG. 1, but the plunger type pump unit shown in FIG. 3 is employed.

Figure 5:
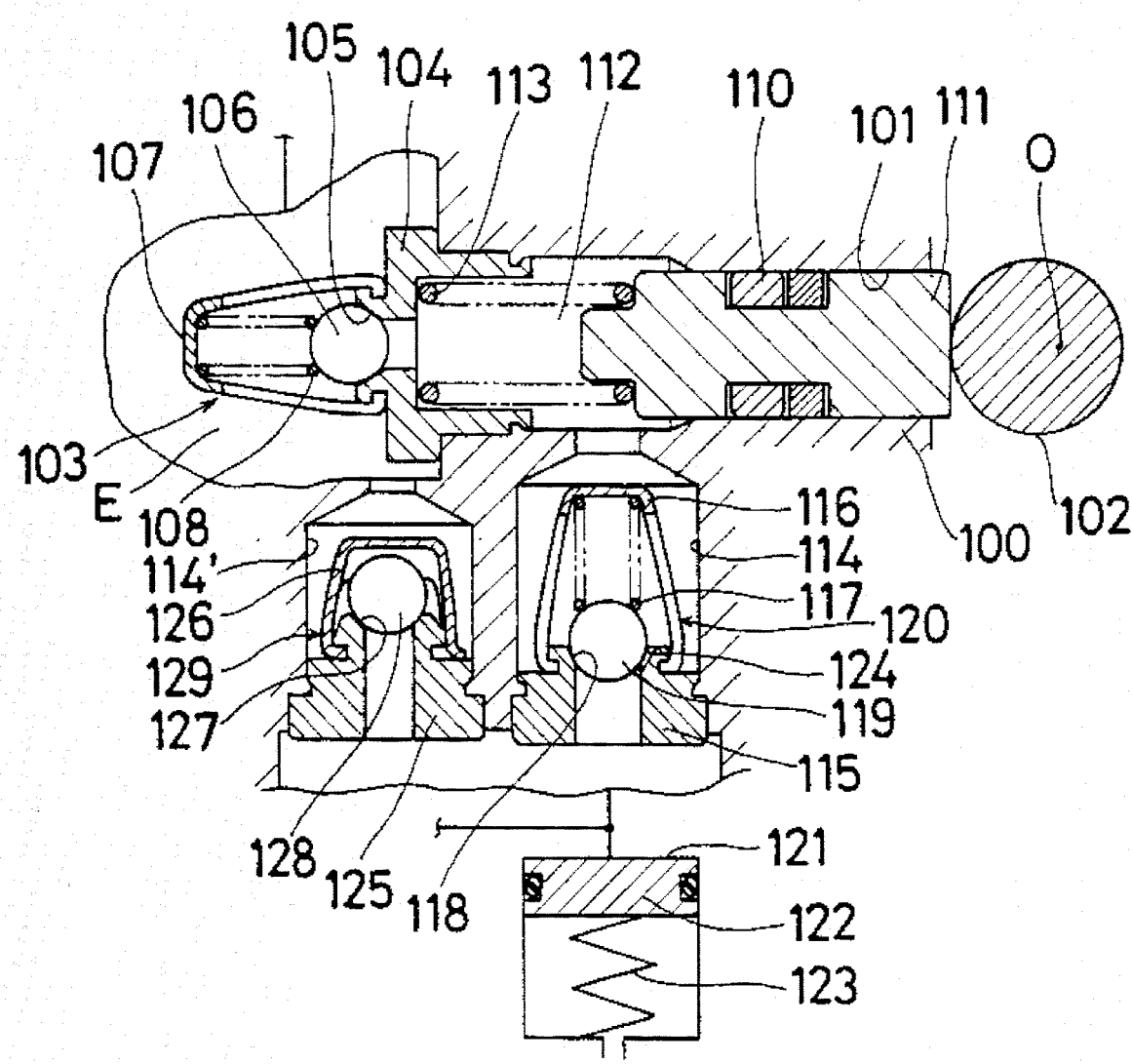
FIG. 5 is an enlarged cross-sectional view of the plunger pump utilized in the system shown in FIG. 4.

In FIG. 5, the pump unit 28, the reservoir 23, and the one-way valve unit 40 are shown in detail. The other pump unit 38 is the same as the one pump unit 28, the other reservoir 33 is the same as the one reservoir 23, and the other one-way valve unit 41 is the same as the one one-way valve unit 40. The pump unit 28 is the same as the pump unit 28 shown in FIG. 3, and the reservoir 23 is the same as the reservoir 23 shown in FIG. 2, so an explanation of the pump unit 28 and the reservoir 23 is not repeated here.

The cylinder 114' is formed parallel to the cylinder 114 and communicates with the brake fluid chamber "E" where the discharge valve is placed. The one-way valve unit 129 (which is the same as the one way valve unit 40 shown in FIG. 4) for evacuation is installed in the cylinder 114'. The one-way valve unit 129 is comprised of a valve seat member 125 installed in the body 100, a retainer 126 installed on the valve seat member 125, and a ball type valve body 128 that is adapted to contact a tapered valve seat 127 of the valve seat member 125.

The valve units 19, 20, 24, 25, 29, 30, 34, 35 and the electric motor 39 are controlled by an electronic control system (not shown) to prevent the wheels from locking according to the behavior of the wheels during braking. The electronic control system detects the behavior of each wheel by a signal from the revolution sensor installed in each wheel, determines whether to decrease or increase brake fluid in each wheel, and operates the valve units 19, 20, 24, 25, 29, 30, 34, 35 and the electric motor 39 accordingly. The electric motor 39 drives both of the plunger type pump units 28 and 38 during the anti-lock control.

During braking, if both the valve units 19 and 24 are operated (i.e., the valve unit 19 is closed and the valve unit 24 is opened), brake fluid in the wheel brake 13 flows out to the reservoir 23 to reduce the brake pressure in the wheel brake 13. If the valve unit 19 is kept operating (i.e., is kept closed) and the valve unit 24 is stopped from operating (i.e., is returned to the normally closed position), the brake fluid in the wheel brake 13 stops flowing out to the reservoir 23 so that the brake pressure in the wheel brake 13 is maintained. If both the valve units 19 and 24 are stopped from operating (i.e., the valve unit 19 is opened and the valve unit 24 is closed), the brake fluid is sent from the master cylinder 12 to the wheel brake 13 to increase the brake pressure in the wheel brake 13. The brake fluid that flows out to the reservoir 23 is returned to the master cylinder 12 through the damper 26 and orifice 27.

After installing the hydraulic brake system in a vehicle, vacuum is supplied from the master cylinder to the wheel brakes 13, 14, 16, 17 through the normally open valve units 19, 20, 29, 30 to evacuate air in the wheel brakes. In this situation, the vacuum is supplied to the part of the brake circuit "B" through the orifice 27 and the damper 26, and is supplied to the part of the brake fluid circuit "A" through the one-way valve unit 40. The vacuum is also supplied to the part of the brake circuit "D" through the orifice 37 and the damper 36 at the same time, and is supplied to the part of the brake circuit "C" through the one-way valve unit 41. The vacuum in the parts of the brake circuit "A" and "C" is supplied to the pump chamber 112 through the slit 124 formed in the suction valve of the pump units 28, 38. Therefore, the air in the reservoirs 23, 33, the pump chamber 112 and the cylinder 114 of the plunger type pump unit 28 is evacuated. The air in the plunger type pump unit 38 is evacuated in the same way as the plunger type pump unit 28.

As mentioned above, after evacuating the air in the hydraulic brake system, the hydraulic brake system is filled up with brake fluid supplied from the master cylinder to.

It is to be understood that the valve circuit is not limited to the particular constructions shown in FIG. 1–FIG. 4 and can be modified with a variety of constructions.

In accordance with the hydraulic brake system of the present invention, it is possible to evacuate air in the pump chamber of the pump. As can be appreciated, this is quite desirable and highly advantageous as compared to other known systems.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which may fall within the spirit and scope of the present invention as defined in the claims, be embraced thereby.

What is claimed is:

1. Hydraulic brake system for a vehicle comprising:
a master cylinder having at least one pressure chamber;
a reservoir;
an actuator for connecting the at least one pressure chamber to wheel brakes of the vehicle to increase hydraulic brake pressure in the wheel brakes by supplying brake fluid to the wheel brakes and for connecting the wheel brakes to the reservoir to reduce the hydraulic brake pressure in the wheel brakes by discharging brake fluid from the wheel brakes to the reservoir, the actuator including a plunger pump having a pump chamber in which is slidably disposed at least a portion of a pump plunger that is operatively associated with a motor; and
said pump including means for evacuating said pump chamber during supply of vacuum from the master cylinder.

2. Hydraulic brake system according to claim 1, wherein said plunger pump includes a discharge valve and a suction valve which each have a valve seat member provided with a tapered valve seat, said means for evacuating including a passageway extending through the valve seat member of one of said discharge valve and said suction valve, said passageway communicating with the pump chamber.

3. Hydraulic brake system according to claim 1, wherein said means for evacuating includes a passage formed in a portion of the pump which permits communication of the pump chamber with the master cylinder.

4. Hydraulic brake system according to claim 1, wherein said actuator includes a pair of normally open two position valve units and a pair of normally closed two position valve units.

5. Hydraulic brake system according to claim 4, including a pair of one-way valve units each of which is disposed in parallel to one of the normally open two position valve units.

6. Hydraulic brake system according to claim 1, including a one-way valve positioned in parallel to the plunger pump.

7. Hydraulic brake system for a vehicle comprising:

a brake circuit for connecting a pressure chamber of a master cylinder to wheel brakes;

a pressure control valve unit installed in the brake circuit for decreasing hydraulic brake pressure in the wheel brake by discharging brake fluid from the wheel brakes to a reservoir;

a plunger pump driven by an electric motor for returning brake fluid from the reservoir to the brake circuit; and a slit formed on at least one of a discharge valve seat of the pump or a suction valve seat of the pump for applying vacuum to a pump chamber of the plunger pump.

8. A hydraulic brake system for a vehicle as set forth in claim 1, further comprising a one-way valve permitting vacuum applied to a part of the brake circuit connected to the pressure chamber to communicate with a part of the brake circuit connected to the reservoir.

* * * * *